United States Patent [19]

Baker

[11] 4,372,260
[45] Feb. 8, 1983

[54] ENGINE FLUID HEATER

[76] Inventor: Wayne Baker, 1315 Richardson, Lewiston, Id. 83501

[21] Appl. No.: 191,347

[22] Filed: Sep. 26, 1980

[51] Int. Cl.³ ............................................ F02M 31/00
[52] U.S. Cl. ...................... 123/142.5 E; 123/142.5 R; 123/557; 210/181; 210/184
[58] Field of Search ......... 123/557, 142.5 R, 142.5 E, 123/549; 210/181, 184

[56] References Cited
U.S. PATENT DOCUMENTS

| | | | |
|---|---|---|---|
| 3,862,037 | 1/1975 | Donaldson et al. | 210/181 |
| 3,929,643 | 12/1975 | Donaldson et al. | 210/181 |
| 4,003,356 | 1/1977 | Nsyler | 123/557 |
| 4,091,265 | 5/1978 | Richards et al. | 123/557 |
| 4,180,036 | 12/1979 | Wolf | 123/557 |

Primary Examiner—Ira S. Lazarus
Attorney, Agent, or Firm—Wells, St. John & Roberts

[57] ABSTRACT

An engine fuel heater for internal combustion engines that mounts between the fuel filter mount and the fuel filter. Liquid fuel is directed through passages in the heater that are complementary to intake and discharge passages through the filter and filter mount. A heat exchanger is situated in or adjacent the fuel passage and operates to heat fuel entering the filter. Water from the engine cooling system, electrical elements, or a combination of both can be used as a source of heat for the heat exchanging elements.

16 Claims, 5 Drawing Figures

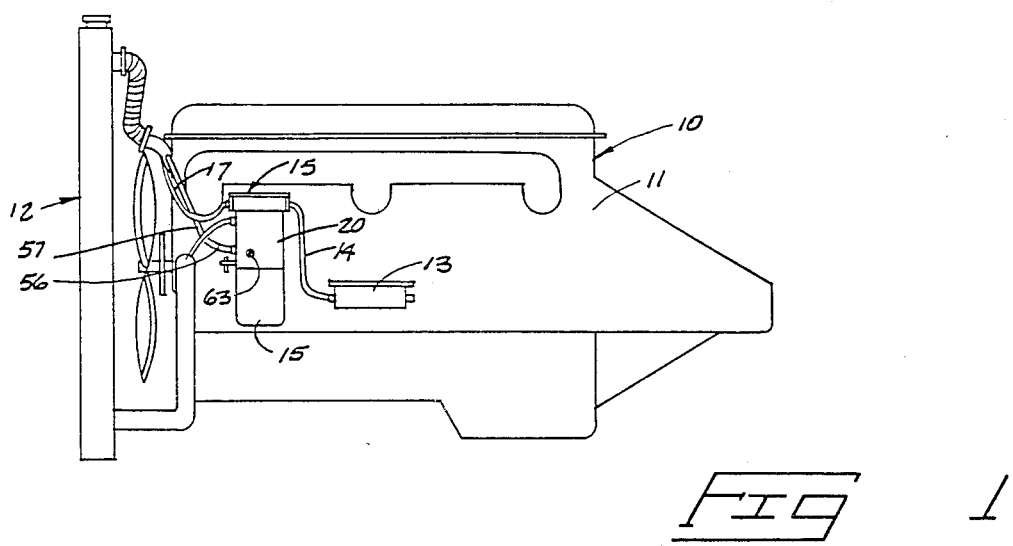
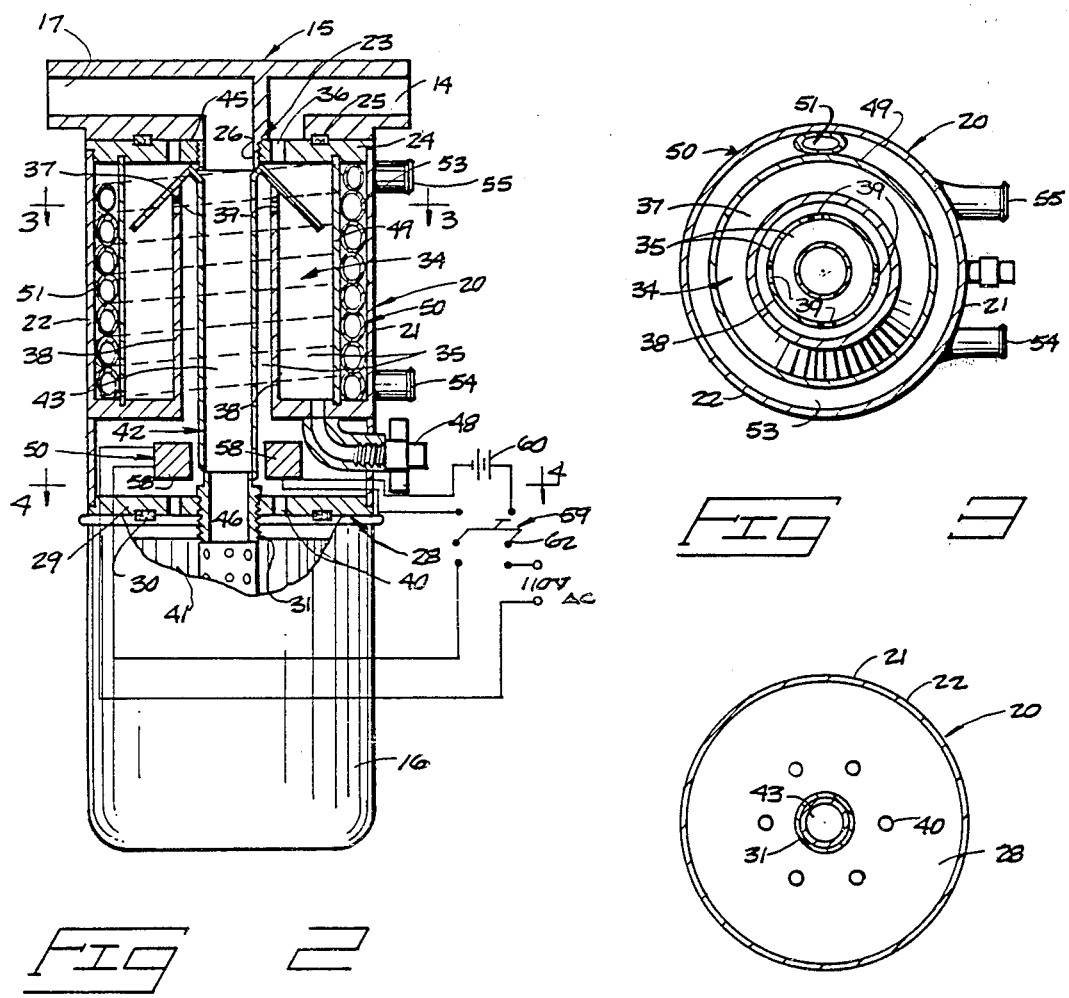

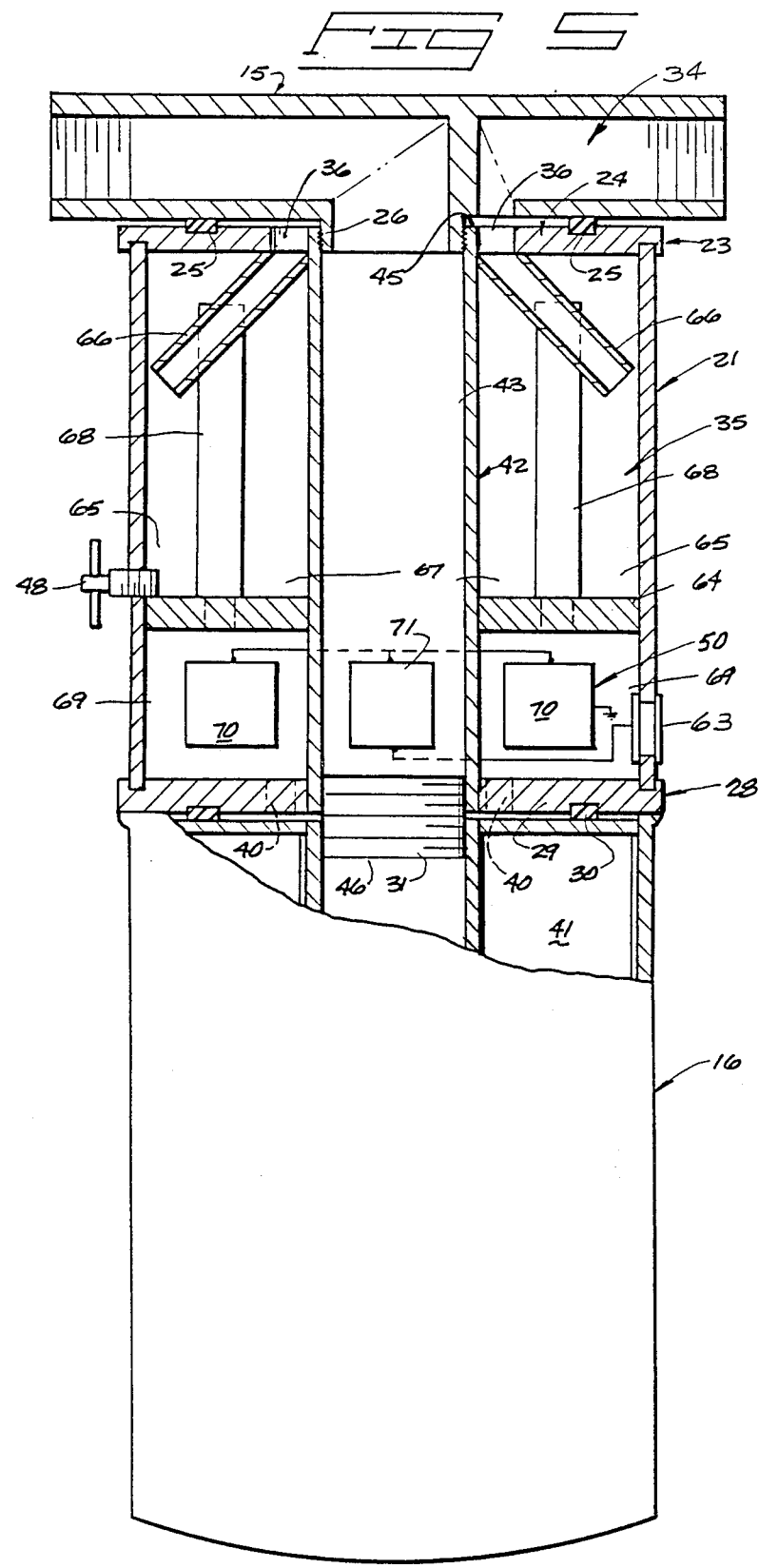

ENGINE FLUID HEATER

BACKGROUND OF THE INVENTION

The present invention is related generally to engine fluid heaters and more particularly to heaters for diesel internal combustion engine fuel. The present apparatus is especially useful for heating diesel fuel, though it can be used for heating other liquids such as lubricating oil, gasoline, or water.

Internal combustion engines (especially diesel engines) are notorious for being difficult to start in cold weather. Low temperatures cause difficulty in effective vaporization of fuel. Unvaporized fuel is difficult to ignite. Fuel that doesn't ignite collects in the engine cylinders and causes flooding.

At very cold temperatures, wax can congeal from diesel fuel within the fuel filter of a diesel engine. The congealed fuel and wax clogs the filter element and starves the engine of fuel. The engine will therefore die and refuse to start until the clogged fuel passage is cleared.

Condensation is another cold weather problem affecting both internal combustion fuel and lubricating oil. Water condensate in oil, gas, or diesel fuel causes further starting problems and promotes corrosion of the internal parts.

A recognized solution to the above problems has been to use various forms of water, oil, and fuel heaters. Special heaters are designed to operate independently from the engine, keeping the oil, water, or fuel at an elevated temperature while the engine is at rest. Such heaters are effective in some instances, but are often difficult to install. Such heaters tend to crowd the already overcrowded engine compartments. Many are too costly due to the special modifications that must be made for their proper installation on different makes and models of engines.

U.S. Pat. Nos. 3,083,833 and 3,097,165 to Kasten and 3,315,737 to Welch all disclose fuel heater and filter combinations wherein the heat exchanging element is in physical contact with the filter. The devices are supplied as units and fit in an aircraft engine fuel line and a coolant passage.

U.S. Pat. No. 2,721,544 to Kimberlin discloses an oil pump that circulates oil through a coil submerged within the heated water to warm the oil.

U.S. Pat. No. 2,713,422 shows the combination of a hot water filter arrangement with a conventional canister type oil filter. Water is directed through a filter arrangement and into a water jacket that surrounds the oil filter. Water warms the oil in the canister. This apparatus probably functions well for canister type filters but is restricted in its use to that particular type of filter.

U.S. Pat. No. 3,795,234 to Stolz discloses two water circulation systems for heating fuel. A pump-fitted heater operates thermostatically to preheat fuel, while a second system can operate with the first or separately therefrom to heat water.

U.S. Pat. No. 3,420,295 to Gotz discloses a combination of a heat exchanger and oil filter. The heat exchanger is situated within the same canister that holds the filter. It is not disclosed how the device is to be mounted to an engine. The device appears to completely replace an existing form of filter canister arrangement, thus requiring dismantling of the existing filtering system to allow installation. Additional modifications then must be made to connect the heat exchanger to the engine cooling system.

The fuel heater described herein can be mounted easily and quickly to an existing engine in close proximity to its fuel filter. The device mounts between the filter and filter mount. No special connections need to be made along the fuel line. The device can make use of heated water from the engine cooling system or an independent electrical heater, or both. The heater elevates the temperature of the incoming fuel and thereby prevents fuel and wax from congealing in the filter. Provision is also made for water separation.

BRIEF DESCRIPTION OF THE DRAWINGS

FIG. 1 is a diagrammatic view illustrating the present device mounted on an internal combustion engine;

FIG. 2 is a sectional view of the present device mounted between a filter mounting bracket and a filter;

FIG. 3 is a sectional view taken along line 3—3 in FIG. 2;

FIG. 4 is a sectional view taken along line 4—4 in FIG. 2; and

FIG. 5 is an enlarged sectional view of a second form of the invention.

DETAILED DESCRIPTION OF THE PREFERRED EMBODIMENTS

One form of the present invention is shown in FIG. 1 mounted to an internal combustion engine 10. The engine 10 includes a cylinder block 11 and a liquid cooling system 12. A fuel pump is generally shown at 13 with a fuel line 14 extending to a fuel supply tank (not shown). A fuel filter head or mount 15 is situated on the block 11 and is connected to the fuel line 14. The fuel filter head 15 typically mounts a disposable fuel filter 16 through which fuel delivered from the pump 13 is circulated. Fuel received through line 14 circulates through the filter from the filter head 15. Fuel leaves the filter 16 and head 15 through a fuel line 17. The fuel line 17 is mounted to the filter head 15 and leads therefrom to a carburetor or injectors (not shown).

The heater 20 embodying a preferred form of the present invention is mountable between the filter head 15 and a conventional fuel filter 16.

The present heater is generally shown in the drawings at 20. It basically includes a hollow heater body 21 that is adapted to fit between the filter head 15 and filter 16. The body 21 is hollow along its length to provide passages for the fuel and to mount one or more forms of heat exchanging elements.

A first mounting means 23 (FIG. 2) is situated at the upper end of the heater body 21. The first mounting means 23 may include an upper header 24 simply comprised of a flat circular plate. The header 24 may also provide a circular gasket 25. Gasket 25 is adapted to seal against the mounting surfaces of the fuel filter head 15. At the center of the circular gasket 25 is a threaded socket 26. The socket 26 is identical to existing threaded sockets of fuel filters 16. The socket can thus be threadably secured to a complimentary fitting on the fuel filter head 15. The heater body 21 can therefore be secured to the engine block 11 simply by threading it onto the existing fuel filter head 15.

The opposite or bottom end of heater body 21 includes a second mounting means 28 adapted to releasably mount the fuel filter 16. The second mounting means 28 may comprise a lower header plate 29 similar to header plate 24. Lower header plate 29 might also include a circular gasket 30 identical to the gasket 25. A threaded male fitting 31 extends axially outward of the heater body 21. The threaded fitting 31 duplicates the fitting conventionally provided on the engine filter head 15. Therefore, a fuel filter 16 can simply be threaded onto the heater 20 in the same manner by which it would otherwise be attached to the filter head 15.

A fuel intake means 34 is provided, extending between the first and second mounting means. The fuel intake means 34 is adapted to openly interconnect the fuel intake passage (line 14) and a similar intake passage of the fuel filter 16.

Fuel intake means 34 includes a passage 35 leading through the heater body 21. Passage 35 extends from at least one opening 36 in the header 24. The passage 35 leads substantially axially through the heater body to discharge openings 40 in the lower header plate 29.

Preferably the passage 35 is axially tortuous within the body. A conical deflector 37 may be provided in the path of fuel incoming through the openings 36. The conical deflector 37 deflects fuel somewhat outwardly and downward along an elongated substantially cylindrical sleeve partition 38. The partition 38 is provided with holes 39 at an upward end adjacent and under the deflector 37.

Fuel received through the openings 36 will circulate downwardly past the deflector 37, then axially upward to pass through the holes 39. From there the fuel reverses direction to continue its tortuous path axially downwardly toward the openings 40 of the lower header 29.

The tortuous fuel path slows the passage of fuel, permitting exchange of heat to it within the passage 35. It also permits gravitational settling of water mixed with the incoming fuel. Such water will be separated at the bottom of passage 35 for later removal through a manual petcock 48.

Fuel being discharged from the heater through the openings 40 is received within the fuel filter element. The warmed fuel circulates through a filter element 41 in the usual manner and subsequently is discharged from the fuel filter into a center fuel discharge means 42 of the present heater.

The fuel discharge means 42 is shown as a hollow elongated upright tube 43. The tube 43 is preferably integral with the threaded socket 26 and threaded male fitting 31. The tube leads from an open end 45 formed within the socket 26 to an open end 46 formed in the male threaded fitting 31. Fuel received from the filter thus moves upward straight through the heater body 21 and directly into the fuel line 17.

Fuel, as well as any accumulated amounts of water, can be drained from the heater body 21 by provision of the drain petcock 48. The petcock 48 facilitates draining of fuel and water from the heater body prior to removal of fuel filter 16 for servicing or replacement purposes.

A heat exchanger means is shown generally at 50 adjacent the intake and discharge means 34 and 42 respectively. The heat exchanger means 50 is adapted to warm the fuel as it passes through the body 21.

Two basic forms of heat exchanger means may be provided in conjunction with the heater body. A cylindrical water jacket is shown at 51 (FIGS. 2 and 3) surrounding the passages 35 and 47. The water jacket 51 may be formed between an outer wall 49 of the intake passage 35 and the outside wall 22 of the heater body. The jacket 51 forms a substantially cylindrical axial enclosure about the passages.

The water jacket 51 includes a coil 53. The coil 53 as shown in this example is mounted within the heater body 21 between walls 49 and 22. Preferably, the coil 53 includes a bottom intake end 54 and a top discharge end 55. The ends 54 and 55 are readily adapted for connection to flexible hoses 56 and 57 (FIG. 1) that lead to the engine water cooling system 12.

The water jacket heat exchanger makes use of heated water received from the engine cooling system to heat the fuel as it passes through the heater body while moving to and from the conventional filter. The water jacket heat exchanger will operate when the engine is running with heated water in the cooling system. Alternatively, the exchanger may operate when the water of the cooling system is independently heated.

Another form of the heat exchanger means 50 is provided as an electric heat element 58 (FIG. 2). The element 58 is preferably of the submersible variety and may be situated within the fuel intake passageway 35 to heat fuel before it passes into the fuel filter.

Preferably, two individual heating elements 58 are provided. One element operates from standard household current. The remaining element operates from the electrical energy supply provided through the engine. A control means 59 may be supplied to selectively actuate either of the heating elements according to need.

One heating element, as shown in FIG. 2, can be connected to a battery 60. The heating element will therefore operate on direct current for short periods of time when the engine is located away from a supply of standard household current. Alternatively, when the engine is located close to a source of household current, a switch 62 may be used to electrically connect the appropriate heat element with the current source. A standard plug-in receptacle 63 (FIG. 1) can be provided on the heater body for this purpose. The control circuit interconnecting the heat elements, switch 62, and selected sources of electrical energy may extend to an easily accessible area adjacent the engine where the switch can be located.

FIG. 5 shows a modified version of the present invention that includes more specific provisions for settling water from fuel before it enters the fuel filter. Water in fuel causes swelling of fibers within the filter and eventually restricts flow of fuel to the engine. It is thus desirable to separate water from the fuel ahead of the fuel filter to thereby increase the effective life of the filter.

The apparatus illustrated in FIG. 5 includes a single annular settling chamber 65 directly below the upper header 24. Fuel is fed into the chamber 65 through angled fuel inlet tubes 66. These tubes direct fuel in and downwardly into the chamber toward a closed end 64 thereof. Adjacent the closed end is a water settling area 67.

Upright outlet tubes 68 lead vertically from the closed chamber end 64. The tubes 68 are hollow and include open upward ends that project above the discharge openings of the inclined tubes 66. The outlet tubes 68 enable escape of fuel from the chamber 65 and into the secondary heating chamber shown at 69. The openings of the outlet tubes 68 are positioned well above the settling area 67 to avoid the possibility of water being discharged through the tubes 68 and eventually into the fuel filter.

FIG. 5 also indicates a single source of heat used to heat fuel passing from the settling chamber 65. Here, an immersion type heater is used, coupled with a thermostat 71 situated in the fuel discharge tube 43. The electrical connections are shown diagrammatically. Fuel flowing into the heat chamber 69 through the several upright outlet tubes 68 is subjected to heat from the elements 70 prior to being released into the attached filter 16. The thermostat can be set to activate the heat elements when the temperature of fuel leaving the filter drops below a prescribed temperature. It can also function to deactivate the heat elements if the discharged fuel temperature is excessively high.

Either form of the present invention may be readily and easily attached to many different forms of existing internal combustion engines. To install the present invention, the existing fuel filter 16 is simply removed by threadably disengaging it from the filter head 15. This filter may be replaced later with a new filter or retained for remounting after the present device is installed.

The fuel heater 20 is attached threadably engaging the socket 26 with the existing male fitting of filter head 15. The heater body 21 is turned onto the fitting until the gasket 25 seals against the filter head.

The fuel filter 16 can then be reinstalled simply by turning it onto the threaded male fitting 31 of the present heater body.

If the water jacket heater arrangement is to be used, heater hoses in the engine cooling system are cut and connected between the jacket openings 54 and 66 and the cooling system 12. The location of connecting points along the cooling system will be similar to those used for other conventional forms of water heating systems. A natural flow of the heating water will therefore occur throughout the water jacket. The water jacket can be used as the sole heating source, or it may be eliminated totally in favor of the electric heat elements 58. Preferably, however, both are used.

The electric heat elements are easily connected to their respective source of electrical energy. The battery operated heat element can be connected by appropriate wires to the battery 60. The household current outlet 63 can be connected by an appropriate extension cord to a common electrical outlet.

The switch 62, provided with the electrical form of the heat exchanger means 50 can be mounted at a convenient location. Operation of the switch determines whether the battery is to be used for supplying heat to fuel passing to the filter or common household current.

Whatever form of heat exchanger is used or in whatever combination, fuel passing through the heater body 21 will be progressively heated prior to delivery into the fuel filter. The fuel is heated again as it is discharged from the filter and passes through the discharge passage of the heater body. The heating of the fuel will prevent wax accumulation and congealing of fuel within the fuel filter under cold weather conditions. I have also found that use of fuel heated by the present apparatus will result in somewhat greater fuel economy.

The above description and attached drawings are given by way of example to set forth a preferred form of the present invention. Other forms and modifications thereof may be envisioned that fall within the scope of the following claims.

What is claimed is:

1. A fuel heater that can be mounted to an internal combustion engine on the original engine fuel filter mount having fuel intake and discharge passages for mounting a removable fuel filter having fuel intake and discharge passages in axial alignment with and complementary to those of the fuel filter mount, said heater comprising:

a hollow heater body having top and bottom ends;

first mounting means on said heater body at the top end thereof adapted to mount the heater body in alignment with the fuel filter mount;

second mounting means on said heater body at the bottom end thereof adapted to releasably mount a fuel filter in alignment with the fuel filter mount;

fuel intake means between said first and second mounting means adapted to openly and axially interconnect the fuel intake passages of the fuel filter mount and a fuel filter mounted to said second mounting means;

fuel discharge means between said first and second mounting means adapted to openly and axially interconnect the fuel discharge passages of the fuel filter mount and a fuel filter mounted to said second mounting means; and heat exchanger means adjacent the intake and discharge means adapted to heat fuel within the hollow heater body between the first and second mounting means thereof.

2. The heater as claimed by claim 1 wherein said intake and discharge means are comprised of open fuel intake and discharge passages formed axially through the hollow body from the first mounting means to the second mounting means.

3. The heater as claimed by claim 2 wherein said heat exchanger means is comprised of an electrical immersion heater mounted within the hollow heater body between the first and second mounting means.

4. A fuel heater for internal combustion engines having water cooling systems, as claimed by claim 2, wherein said heat exchanger means is comprised of:

a water heating coil encircling the open fuel passages; and connector means on the coil adapted to receive and direct water through said coil from the cooling system.

5. A fuel heater for internal combustion engines having water cooling systems, as claimed by claim 2, wherein said heat exchanger means is comprised of:

a water heating coil encircling the open fuel passages; and connector means on the coil adapted to receive and direct water through said coil from the cooling system; and an electrical immersion heater mounted within the hollow heater body.

6. The fuel filter as claimed by claim 2 wherein the fuel intake passage is tortuous throughout the interior of the hollow heater body.

7. The fuel heater as claimed by claim 1 wherein said heat exchanger means is comprised of an electrical heat element mounted to said hollow heater body.

8. A fuel heater for an internal combustion engine having a water cooling system and a source of electrical energy as claimed by claim 1 wherein said heat exchanger is further comprised of:

a water jacket surrounding the intake and discharge means between the first and second mounting means, adapted to receive water from the engine cooling system; and an electrical heating element adjacent the intake and discharge means spaced adjacent to said water jacket between the first and second mounting means.

9. A fuel heater as claimed by claim 8, further comprising:

electrical energy supply control means connected to the electrical heating element and having a power source supply switch adapted to be connected to the source of electrical energy for the engine and to a source of standard household current;

switch means interconnecting the sources of electrical energy to the element, operable to direct electrical energy from either supply to the heating element; and an electrical receptacle on the heater body adapted to connect the control means and heating element to a source of electrical energy.

10. The fuel heater as claimed by claim 8 wherein said water jacket includes a water heating coil located between the first and second mounting means having an open intake end and an open discharge end, said open ends being adapted for connection to the water cooling system of the engine.

11. A fuel heater for an internal combustion engine having a water cooling system as defined by claim 1 wherein said heat exchanger is further comprised of:

a water jacket encircling the fuel intake and discharge means within the hollow heater body between the first and second mounting means; and axially spaced intake and discharge openings into the water jacket between the first and second mounting means adapted to be connected to the engine cooling system.

12. A fuel heater for an internal combustion engine having a water cooling system as defined by claim 1 wherein said heat exchanger is further comprised of:

a water jacket encircling the fuel intake and discharge means within the hollow heater body; and intake and discharge openings into the water jacket adapted to be connected to the engine cooling system; and an electrical heat element on the hollow heater body.

13. The fuel heater as claimed by claim 1 wherein the hollow heater body is divided axially with a settling chamber and a secondary heating chamber spaced apart axially between the first and second mounting means, and further comprising a petcock on the hollow heater body openly communicating with the settling chamber.

14. The fuel heater as claimed by claim 1 wherein the hollow heater body is divided axially with a settling chamber and a secondary heating chamber spaced apart axially between the first and second mounting means, and further comprising a petcock on the hollow heater body openly communicating with the settling chamber; and an electrical immersion heater situated within the secondary heating chamber.

15. The fuel heater as claimed by claim 14 further comprising a thermostat control operatively connected to the immersion heater and positioned within the heater body in the discharge passage thereof to sense the temperature of fuel passing therethrough.

16. The fuel heater as claimed by claim 1 further comprising thermostat control means operatively connected with the heat exchanger means for operating the heat exchanger means in response to sensed temperature of the fuel passing through the heater body.

* * * * *